US008650632B2

(12) United States Patent
Boscolo et al.

(10) Patent No.: US 8,650,632 B2
(45) Date of Patent: Feb. 11, 2014

(54) SCALABLE TRANSPARENT PROXY

(75) Inventors: Christopher Boscolo, Bellevue, WA (US); Brad Robel-Forrest, North Bend, WA (US); Bryan Phillippe, Sammamish, WA (US)

(73) Assignee: Watchguard Technologies, Inc., Seattle, WA (US)

( * ) Notice: Subject to any disclaimer, the term of this patent is extended or adjusted under 35 U.S.C. 154(b) by 0 days.

(21) Appl. No.: 13/457,319

(22) Filed: Apr. 26, 2012

(65) Prior Publication Data

US 2012/0216275 A1 Aug. 23, 2012

Related U.S. Application Data

(60) Division of application No. 11/778,350, filed on Jul. 16, 2007, now Pat. No. 8,191,132, which is a continuation of application No. 11/603,311, filed on Nov. 20, 2006, now abandoned, which is a continuation of application No. 11/413,224, filed on Apr. 28, 2006, now abandoned, which is a continuation of application No. 11/213,340, filed on Aug. 25, 2005, now abandoned.

(60) Provisional application No. 60/605,302, filed on Aug. 27, 2004.

(51) Int. Cl.
*G06F 7/04* (2006.01)

(52) U.S. Cl.
USPC .............................................. 726/13; 726/14

(58) Field of Classification Search
USPC ...................................................... 726/13, 14
See application file for complete search history.

(56) References Cited

U.S. PATENT DOCUMENTS

| 2003/0202535 | A1* | 10/2003 | Foster et al. | 370/469 |
| 2004/0028047 | A1* | 2/2004 | Hou et al. | 370/392 |
| 2004/0187028 | A1* | 9/2004 | Perkins et al. | 713/201 |

* cited by examiner

*Primary Examiner* — Christopher Brown
(74) *Attorney, Agent, or Firm* — Kory D. Christensen; Stoel Rives LLP (57) ABSTRACT

A facility for proxying network traffic between a pair of nodes is described. The facility receives packets traveling between the pair of nodes that together constitute a network connection. For each packet of the connection that is part of a transport protocol setup process, the facility updates a representation of the status of the setup process to reflect the packet, and forwards the packet to its destination without proxying the packet. For each packet of the connection that is subsequent to the setup process, the facility proxies the contents of the packet to the packet's destination.

16 Claims, 11 Drawing Sheets

| source IP | source port | dest IP | dest port | transport protocol | action | protocol handler chain |
|---|---|---|---|---|---|---|
| * | * | * | 80, 8080 | TCP | allow | HTTP-PH | policy table 400
401
411　412　413　414　415　416　417

FIG. 4

| connection id | source IP | source port | dest IP | dest port | proxy |
|---|---|---|---|---|---|
| 3113 | 196.0.0.31 | 176 | 241.7.7.6 | 80 | yes | connection table 500
501
511　512　513　514　515　516

| connection id | action | setup state | A's A-to-B seq # | B's A-to-B seq # | A's B-to-A seq # | B's B-to-A seq # | out-of-order data pointer |
|---|---|---|---|---|---|---|---|
| 3113 | setup | SYN | 32 | 32 | 0 | 0 | |

FIG. 8

| connection id | action | setup state | A's A-to-B seq # | B's A-to-B seq # | A's B-to-A seq # | B's B-to-A seq # | out-of-order data pointer |
|---|---|---|---|---|---|---|---|
| 3113 | setup | SYN-ACK | 32 | 32 | 32 | 32 | |

FIG. 9

| connection id | action | setup state | A's A-to-B seq # | B's A-to-B seq # | A's B-to-A seq # | B's B-to-A seq # | out-of-order data pointer |
|---|---|---|---|---|---|---|---|
| 3113 | proxy | complete | 64 | 64 | 32 | 32 | |

FIG. 17 stack data table — 1700
out-of-order data pointer — 1701

| connection id | action | setup state | A's A-to-B seq # | B's A-to-B seq # | A's B-to-A seq # | B's B-to-A seq # | |
|---|---|---|---|---|---|---|---|
| 3113 | proxy | complete | 128 | 128 | 98 | 160 | |

1711, 1712, 1713, 1714, 1715, 1716, 1717, 1718

FIG. 18 stack data table — 1800
out-of-order data pointer — 1801

| connection id | action | setup state | A's A-to-B seq # | B's A-to-B seq # | A's B-to-A seq # | B's B-to-A seq # | |
|---|---|---|---|---|---|---|---|
| 3113 | data relay | complete | 192 | 192 | 4194 | 4256 | |

1811, 1812, 1813, 1814, 1815, 1816, 1817, 1818

SCALABLE TRANSPARENT PROXY

CROSS-REFERENCE TO RELATED APPLICATIONS

This application is a divisional of U.S. patent application Ser. No. 11/778,350, filed Jul. 16, 2007, which is a continuation of U.S. patent application Ser. No. 11/603,311, filed Nov. 20, 2006, which is a continuation of U.S. patent application Ser. No. 11/413,224, filed Apr. 28, 2006, which is a continuation of U.S. patent application Ser. No. 11/213,340, filed Aug. 25, 2005, which claims the benefit of U.S. Provisional Patent Application No. 60/605,302, filed on Aug. 27, 2004, which applications are incorporated herein in their entirety by reference.

TECHNICAL FIELD

The present invention is directed to the field of network security, and, more particularly, to protocol-aware network security techniques.

BACKGROUND

Network security concerns protecting one or more computer systems from hazardous data transmitted to the protected computer systems via a network. In many cases, providing network security services involves installing a special network node between the protected computer systems and a public network.

For example, it is common to install a network node performing a connection firewall function between connected computer systems and a public network such as the Internet. Typical conventional connection firewalls decline risky network connections of one or more kinds, such as outbound network connections to IP addresses known to be dangerous, and some or all types of inbound network connections not initiated by one of the protected computer systems.

Serious network security risks can persist after installing and enabling a connection firewall, however. As one example, a user of a protected computer system may be induced to establish an outbound network connection with an external node that transmits hazardous data, despite having an address not known to be dangerous.

As another example, where a computer system protected by a connection firewall must be able to receive unsolicited connections from external nodes, an administrator may disable the firewall's blocking of externally-initiated connections, at least for certain types of connections and/or certain protected computer systems. Where blocking of externally-initiated connections is disabled, an external node can successfully make an unsolicited connection to a protected computer system and transmit hazardous data to it.

Some of the weaknesses of connection firewalls can be overcome by supplementing a connection firewall with a security device that monitors the data transmitted between protected computer systems and exterior nodes within connections that the connection firewall permits to be established.

One kind of conventional data monitoring security device is an intrusion prevention system. A typical intrusion prevention system monitors data transmitted between protected computer systems and exterior nodes for data that matches a set of intrusion patterns maintained by the intrusion prevention system. When the intrusion prevention system identifies data matching one of its intrusion patterns, the intrusion prevention system closes the connection by which the data was sent.

Conventional intrusion prevention systems have significant disadvantages. First, they provide no protection from attacks that do not match any of the intrusion patterns maintained by the intrusion prevention system. An attack may not match any of the intrusion patterns maintained by the intrusion prevention system, for example, where the attack is of a new type, or where the attack is a new, non-matching expression of an existing type. Further, conventional intrusion prevention systems can only act by closing connection, which may unnecessarily interrupt communications that are useful to a user of a protected computer system.

Another kind of conventional data monitoring security device is an application firewall, which uses a deeper understanding of a particular network application to analyze data contained in network traffic for that application.

Conventional application firewalls likewise have significant disadvantages. First, they typically lack complete transparency. For example, conventional application firewalls typically do not establish sessions in the TCP protocol transparently, causing applications that rely on a strict implementation of the TCP protocol to fail, unless and until they are modified to alter the way in which they implement the protocol. Conventional application firewalls further are typically not extensible or customizable, limiting their usefulness.

In view of the shortcomings of conventional data monitoring approaches discussed above, a data monitoring approach that overcame one or more of these shortcomings would have substantial utility.

DETAILED DESCRIPTION

A software facility for providing network security services ("the facility") is provided. In some embodiments, the facility integrates application proxying with policy enforcement, which facilitates the consolidation of shared resources, and the sharing of information between these two kinds of functionality.

In some embodiments, the facility provides transparent, unproxied transport protocol connection setup, which in turn provides a higher level of compatibility with applications that have dependencies on the connection setup process. The facility goes on to proxy each connection once the setup process is complete, (1) accumulating application data for contextual analysis, in proper order, by application-specific modules called gatekeeper modules or application protocol handlers, and (2) acknowledging data not yet received by addressee.

By providing application data to gatekeeper modules in proper sequence order and permitting the gatekeeper modules to accumulate enough application data to satisfy them that the application data is free of exploits before forwarding it to its destination, the facility can repel some exploits designed to evade conventional intrusion detection systems by, for example, sending packets out of order, or spreading evidence of the exploit out over a larger number of packets than a typical intrusion detection system has the ability to examine at a single point in time. Where a gatekeeper module detects an exploit or other suspicious behavior at the application level, embodiments of the facility permit the gatekeeper module to perform various kinds of remediation: the gatekeeper module can rewrite application traffic contents, drop the offending connection (with differing drop behavior on each side of the connection), log the behavior, add the address of the offending node to list of blocked nodes, etc.

Some embodiments of the facility use an architecture that provides a significant measure of extensibility to the application proxying process. For example, a new gatekeeper module may be straightforwardly developed and incorporated to proxy a new network application, or to provide new functionality for an existing application. In some embodiments, a new gatekeeper module can be implemented in a script language. In some embodiments, gatekeeper modules are only executed when necessary, conserving processing resources. In some embodiments, gatekeeper modules execute in user space to provide better compartmentalization. In some embodiments, gatekeeper modules can be chained to (a) support layered protocols, or (b) provide additional enhancements for a single application and protocol. Some embodiments provide and/or support a "magic" gatekeeper module that contains custom code to analyze and redirect a connection to the appropriate application module.

In some embodiments, the facility permits gatekeeper modules to spoof an unprotected server, redirected protected clients to another server. In some embodiments, the facility randomizes packet sequence numbers to provide an additional measure of security.

Some embodiments increase throughput by using special-purpose hardware to assist with functions such as packet validity assessment, connection lookup, or post-proxying data relay ("cut-through").

Figure 1:
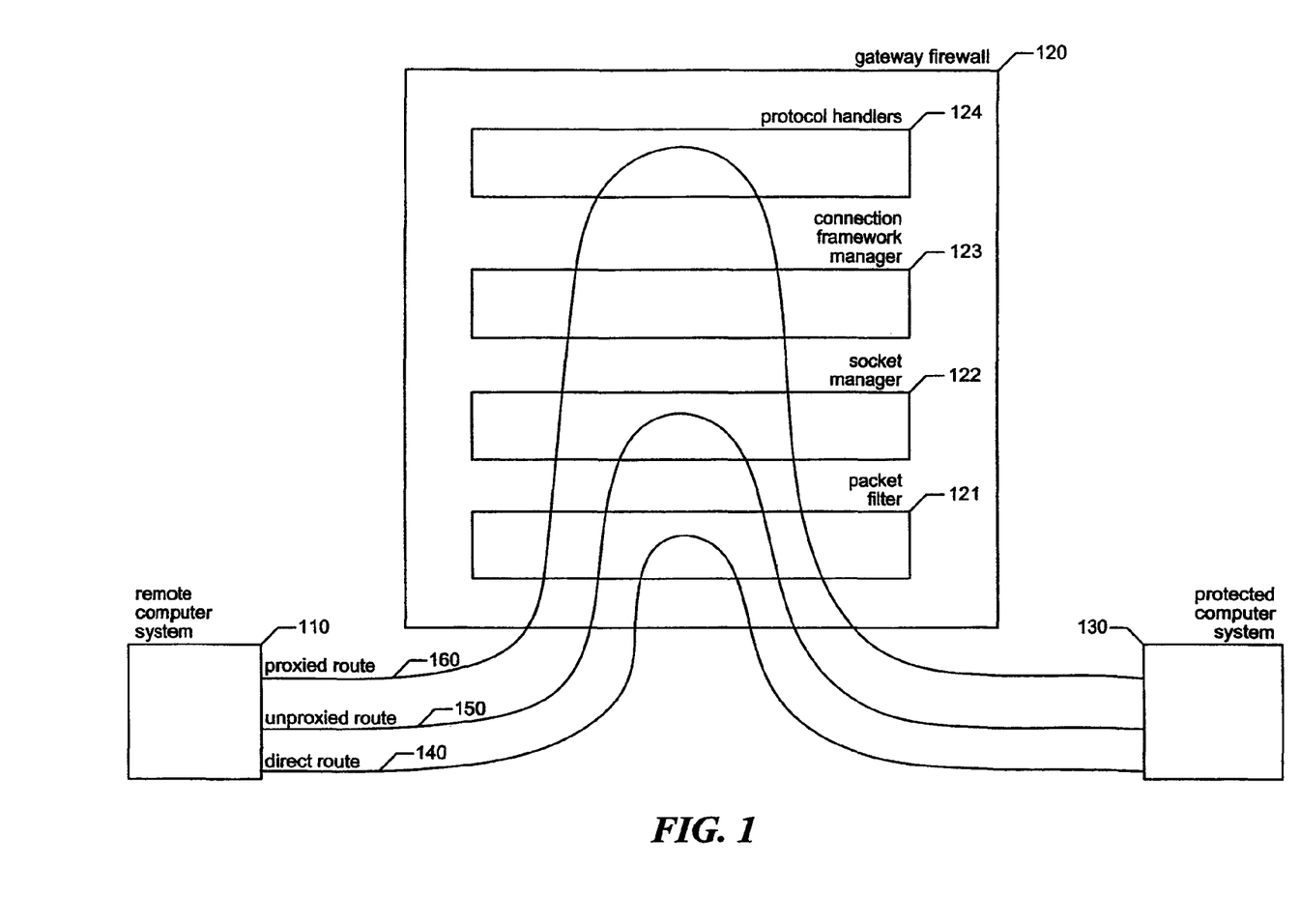
FIG. 1 is an architectural diagram showing a typical architecture used by the facility.

FIG. 1 is an architectural diagram showing a typical architecture used by the facility. The facility uses a gateway firewall device 120 to intercept network traffic passing between pairs of computer systems, such as a remote computer system 110 and a protected computer system 130. When a network packet is received at the gateway firewall, such as a packet addressed to or received from a protected computer system, they are initially routed to a stateful packet filter 121. The packet filter applies security policies to each received packet, maintains a connection table of permissible network connections for which packets have been received, and determines which connections' packets should be sent to a socket manager 122 for potential proxying. Packets for connections not determined to be proxied pass through the gateway firewall via a direct route 140 that bypasses components of the gateway firewall other than the packet filter. When the socket manager receives a packet from the packet filter that is part of a transport protocol setup process—such as the 3-way handshake setup process used by the TCP transport protocol—the socket manager forwards the packet directly to the packet's destination, and updates a setup status maintained for the connection in a stack data table. The socket manager does not proxy such packets; i.e., the socket manager merely passes them onto their destination, without generating and sending an acknowledgement of the packet to the packet's source, and without subjecting the contents of such packets to any protocol handlers. This enables the facility to support network applications that rely on not getting an acknowledgment for packets not received by their addressees. Setup packets for a proxied connection pass through the gateway firewall on an unproxied route 150 that bypasses components of the gateway firewall other than the packet filter and socket manager.

After the socket manager forwards the final packet in the connection setup process, it updates the stack data table to indicate that future packets of the connection should be proxied. When packets of the connection are subsequently received, the socket manager proxies them: it immediately generates and sends an acknowledgement to the sender of the packet, and uses the packet's sequence number to determine whether the packet immediately follows the last in-order packet received in the same direction in the connection. If not, the socket manager stores the packet on a list of out-of-order packets for the connection. When an in-order packet is subsequently received, the socket manager combines it with any contiguous out-of-order packets, and passes it to a connection framework manager 123, thus following the proxied route 160.

When the connection framework manager ("CFM") receives a batch of packets from the socket manager for a connection, it passes the contents of the packets to an ordered sequence of one or more application-specific protocol handlers 124 specified for the connection. In some embodiments, the connection framework manager communicates with both the socket manager and the protocol handlers using an event-based API, in which voluminous data is generally passed by reference rather than by value, when possible.

When a protocol handler in the specified chain receives packet contents from the connection framework manager, the protocol handler combines the packet contents with any saved, previously received packet contents, and performs an application-specific analysis on the combined content. Where the analysis indicates that the contents should not be passed onto their destination in their original form, the protocol handler performs one or more remediation steps, such as modifying the content, instructing the socket manager to close the connection, adding one of the ends of the connection to a list of blocked addresses, etc. If any of the content in the possession of the protocol handler is ready to be transmitted to its destination, the protocol handler passes that data to the socket manager via the connection framework manager. The socket manager uses information in the stack data table to generate packets to contain the data that have appropriate sequence numbers for the destination side of the connection, and sends these packets to the destination, either through the packet filter or bypassing the packet filter.

At some point in the connection, an invoked protocol handler may determine that, for the remainder of the connection, data need not pass through the protocol handler. It may do so, for example, where a point in the connection is reached where it would be impossible to perform any of the exploits tested for by the protocol handler. For example, an HTTP protocol handler that tests only for exploits occurring in the header of an HTTP connection may determine that data of the connection following the header need not pass through the protocol handler. In this case, the protocol handler updates the stack data table to specify a data relay mode for the connection. Subsequent packets in the connection are either (1) received in the socket manager without passing through the connection framework manager or protocol handlers, thus following the unproxied route 150 or (2) received and processed only in the packet filter, thus following the direct route 140.

By providing network security services in some or all of the manners described above, embodiments of the facility provides substantial advantages over conventional data monitoring network security techniques.

While various functionalities and data are shown in FIG. 1 as residing on particular computer systems or other devices that are arranged in a particular way, those skilled in the art will appreciate that such functionalities and data may be distributed in various other ways across computer systems in different arrangements.

Figure 2:
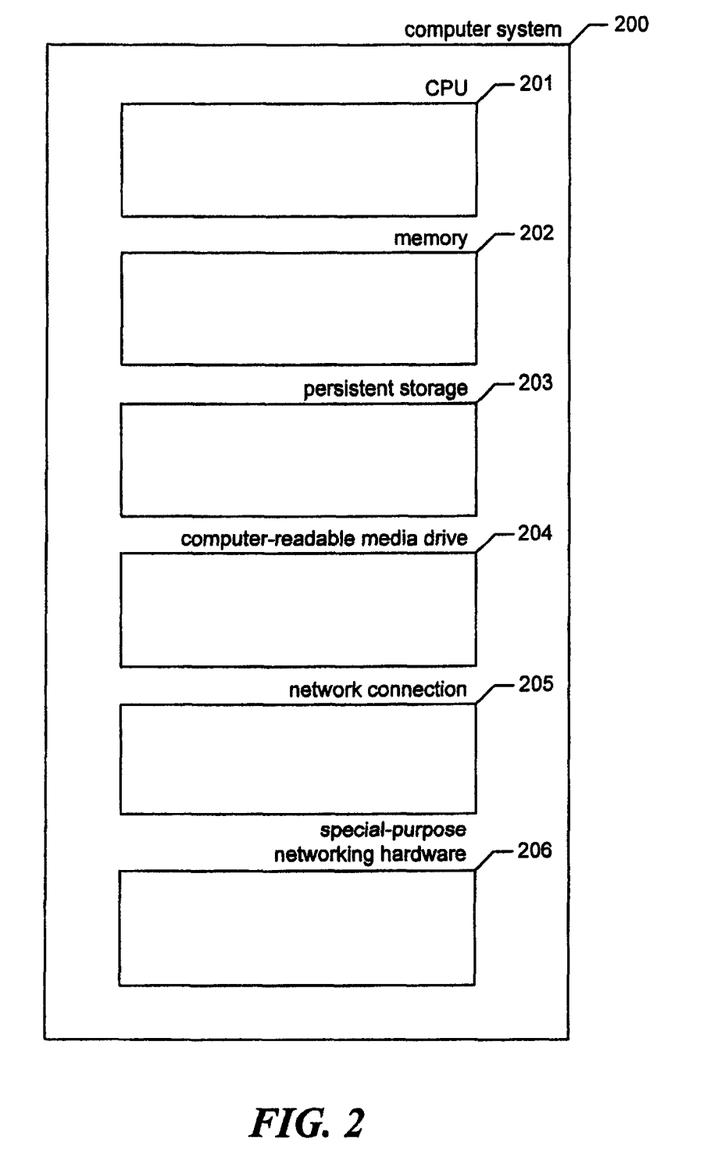
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data—including data structures—while they are being used; a persistent storage device 203, such as a hard drive, for persistently storing programs and data; a computer-readable media drive 204, such as a CD-ROM drive, for reading programs and data stored on a computer-readable medium; and a network connection 205 for connecting the computer system to other computer systems, such as via the Internet, to exchange programs and/or data—including data structures. In some embodiments, the computer system further includes special-purpose networking hardware 206, to which the facility may delegate certain functions relating to network operations. Examples of such special-purpose hardware and its use are described, for example, in U.S. Pat. No. 6,732,199, entitled "Software Programmable Calendar Queue Cache," issued on May 4, 2004; U.S. Pat. No. 6,560,238, entitled "Calendar Queue Cache," issued May 6, 2003; U.S. Pat. No. 6,542,508, entitled "Policy Engine Using Stream Classifier and Policy Binding Database to Associate Data Packet with Appropriate Action Processor for Processing Without Involvement of a Host Processor," issued Apr. 1, 2003; U.S. Pat. No. 6,625,150, entitled "Policy Engine Architecture," issued on Sep. 23, 2003; U.S. Pat. No. 6,751,668, entitled "Denial-of-Service Attack Blocking with Selective Passing and Flexible Monitoring," issued on Jun. 15,2004; U.S. patent application Ser. No. 09/732,543, entitled "Tunnel Designation System for Virtual Private Networks," filed on Dec. 7, 2000; U.S. Patent Application Ser. No. 60/112,976, entitled "Method for Synchronization of Policy Cache with Various Policy-Based Applications," filed on Dec. 17, 1998; and U.S. patent application Ser. No. 09/464,041, entitled "Fairness of Bandwidth Allocation Within a Flow, " filed on Dec. 16, 1999, each of which is hereby incorporated by reference in its entirety. While computer systems configured as described above are typically used to support the operation of the facility, one of ordinary skill in the art will appreciate that the facility may be implemented using devices of various types and configurations, and having various components.

Figure 3:
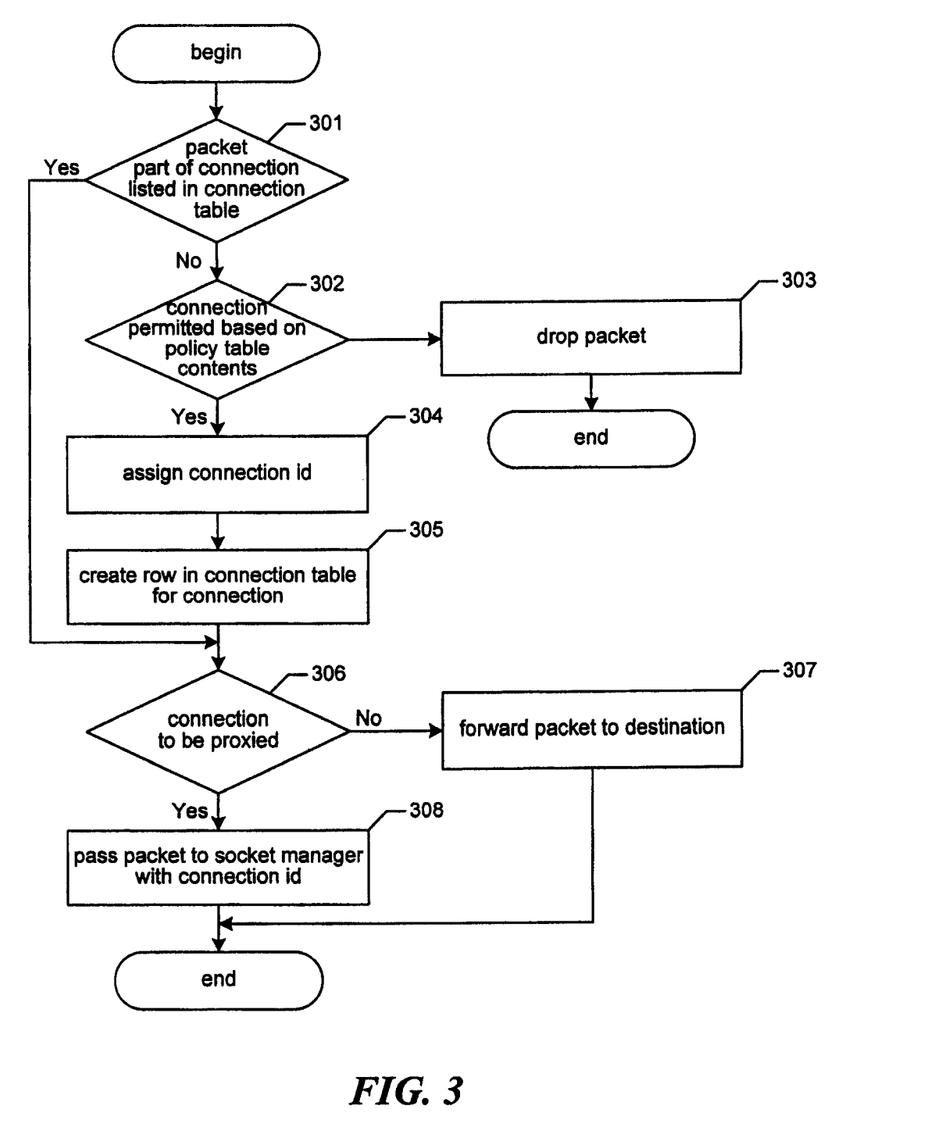
FIG. 3 is a flow diagram showing steps typically performed by the facility in the packet filter to process a packet received by the gateway firewall.

FIG. 3 is a flow diagram showing steps typically performed by the facility in the packet filter to process a packet received by the gateway firewall. In step 301, if the packet belongs to a connection listed in the connection table, then the facility continues in step 306, else the facility continues in step 302. In step 302, if the connection is permitted based upon the contents of the policy table, then the facility continues in step 304, else the facility continues in step 303 to drop the packet and these steps conclude.

Figure 4:
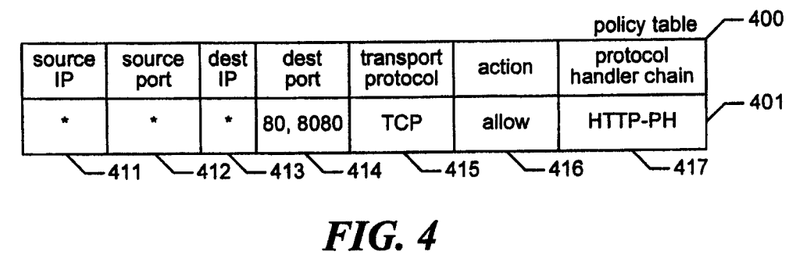
FIG. 4 is a data structure diagram showing sample contents of a policy table typically used by the facility.

FIG. 4 is a data structure diagram showing sample contents of a policy table typically used by the facility. The policy table 400 is made up of rows, such as row 401, each specifying a security policy to be enforced by the gateway firewall. In the example, each row is divided into the following columns: a source IP address column 411, a source port column 412, a destination IP address column 413, a destination port column 414, a transfer protocol column 415, an action column 416, and a protocol handler chain column 417. Where data from a received packet's header matches the contents of columns 411-415, the packet filter performs the filtering action specified in the row in column 416, and determines a protocol handler chain for the packet's connection as specified in the row in column 417. For example, any TCP packet sent to the destination port 80 or 8080 matches the policy of row 401, and will accordingly be allowed, and its connection will be proxied through a protocol handler chain containing a single protocol handler for HTTP.

Returning to FIG. 3, in step 304, the facility assigns a connection ID to the packet's connection. In step 305, the facility creates a new row in the connection table for the connection.

Figure 5:
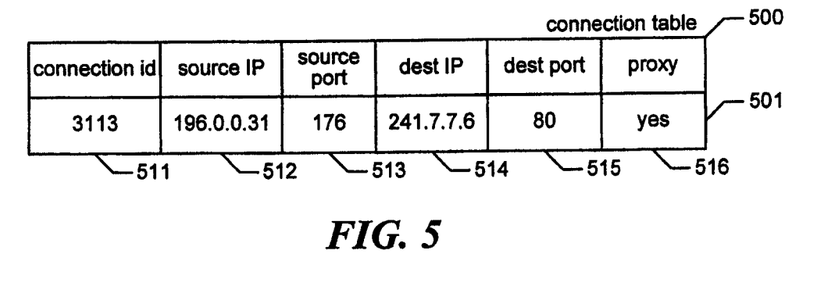
FIG. 5 is a table diagram showing a sample connection table typically used by the facility to track active, permissible connections.

FIG. 5 is a table diagram showing a sample connection table typically used by the facility to track active, permissible connections. The connection table contains rows, such as row 501, each corresponding to a different active, permissible connection. Each row is divided into the following columns: a connection ID column 511, an IP address A column 512, a port A column 513, an IP address B column 514, a port B column 515, and a proxy column 516. When a packet from 196.0.0.31:176 to 241.7.7.6:80 or a packet from 241.7.7.6:80 to 196.0.0.31:176 is subsequently received, the facility in step

301 matches the packet to row 501 of the connection table and determines (1) that the connection has a connection ID of 3113, and (2) that the connection should be proxied.

Returning to FIG. 3, if the connection table row for the packet's connection indicates that the connection is to be proxied, then the facility continues in step 308, else the facility continues in step 307. In step 307, the facility forwards the packet to its destination directly from the packet filter. After step 307, these steps conclude. In step 308, the facility passes the packet to the socket manager together with its connection ID. After step 308, these steps conclude.

Figure 6:
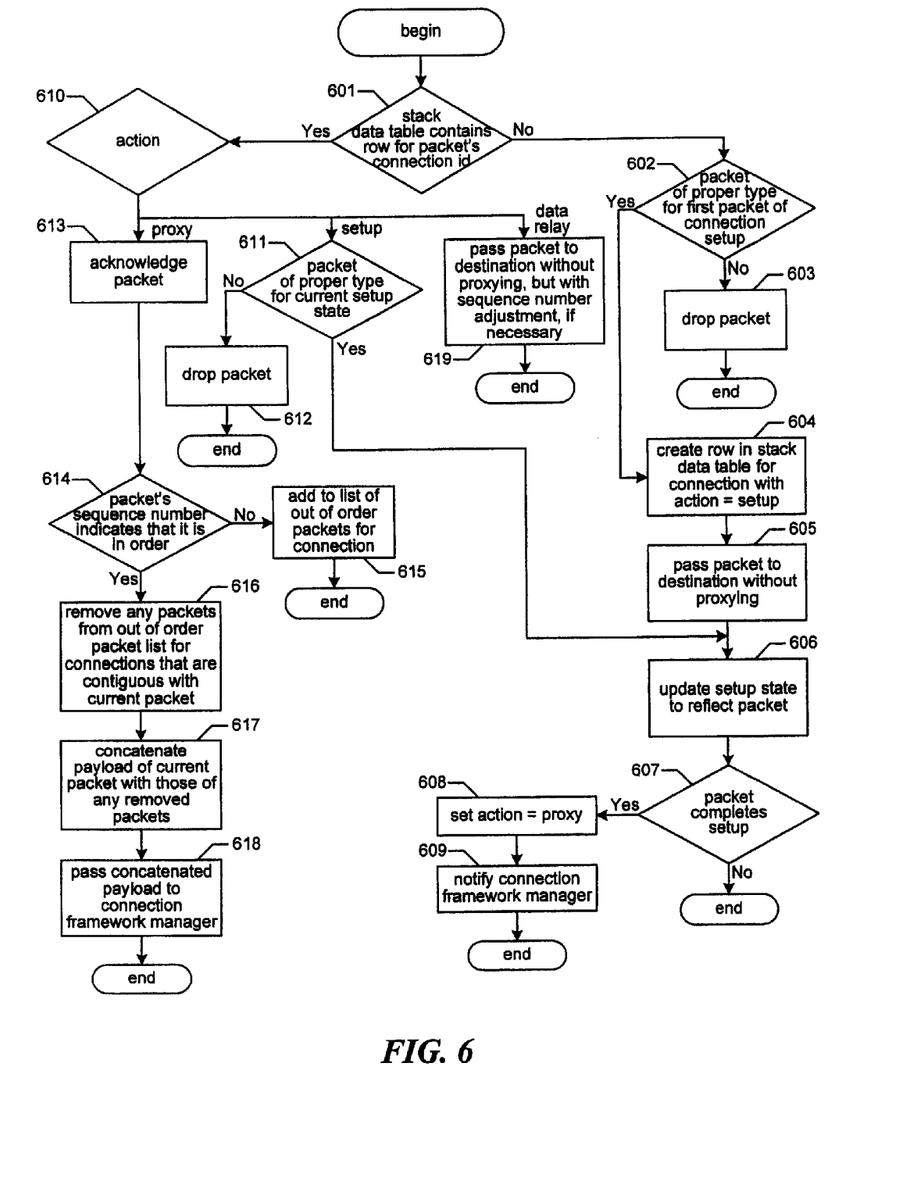
FIG. 6 is a flow diagram showing steps typically performed by the facility in the socket manager to process a packet received from the packet filter.

FIG. 6 is a flow diagram showing steps typically performed by the facility in the socket manager to process a packet received from the packet filter. In step 601, if the stack data table contains a row for the received packet's connection ID, then the packet is not the first packet of its connection and the facility continues in step 610, else the packet is the first packet in this connection, and the facility continues in step 602. In step 602, if the packet is of proper type for the first packet of the connection setup process for the packet's transport protocol, then the facility continues in step 604, else the facility continues in step 603. For example, the TCP transport protocol's 3-step handshake connection setup process consists of a sequence of three types of packets: a SYN packet from the first node to the second node, a SYN/ACK packet from the second node to the first node, and an ACK packet from the first node to the second node. Accordingly, in step 602, for a packet transported via TCP, the facility determines whether the packet is a SYN packet. Those skilled in the art will appreciate that the facility may be straightforwardly used in connection with other transport protocols, including UDP. In step 603, because the packet's type does not match the setup process for its transport protocol, the facility drops the packet. After step 603, these steps conclude.

In step 604, the facility creates a row in the stack data table for the packet's connection's connection ID. The created row specifies the setup action.

Figure 7:
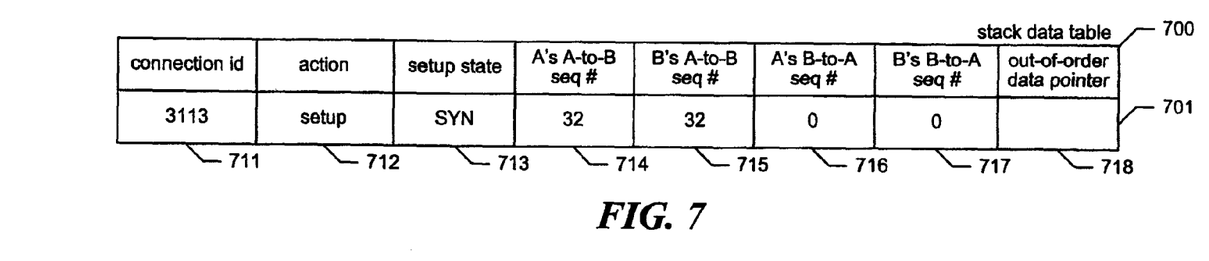
FIG. 7 is a data structure diagram showing sample contents of a stack data table typically used by the facility.

FIG. 7 is a data structure diagram showing sample contents of a stack data table typically used by the facility. The stack data table 700 is made up of rows, such as row 701, each corresponding to an active connection for which the socket manager has received a packet, and indicating the socket manager's view of the status of the connection. Each row is divided into the following columns: a connection id column 711, an action column 712, a setup state column 713, a column 714 containing the sequence number of the connection in the A-to-B direction from A's perspective, a column 715 containing the sequence number of the connection in the A-to-B direction from B's perspective, a column 716 containing the sequence number of the connection in the B-to-A direction from A's perspective, a column 717 containing the sequence number of the connection in the B-to-A direction from B's perspective, and an out-of-order data pointer column 718. In row 701 for connection 3113, the current action is setup and the current setup state is SYN, indicating that the first packet of the connection setup process, the SYN packet, has been received. Columns 714 and 715 indicate that the sequence number in the A-to-B direction, from the perspective of both nodes, is 32. In some embodiments, the facility initially chooses a different sequence number for the first packet on B's side to provide an extra measure of security. Because no out-of-order data has yet been received, the out-of-order data pointer column is empty.

Returning to FIG. 6, in step 605, the facility passes the packet to its destination without proxying the packet—that is, without itself generating and sending an acknowledgment to the packet's sender. In step 606, a facility updates the setup state in the stack data table to reflect the setup packet.

Figure 8:
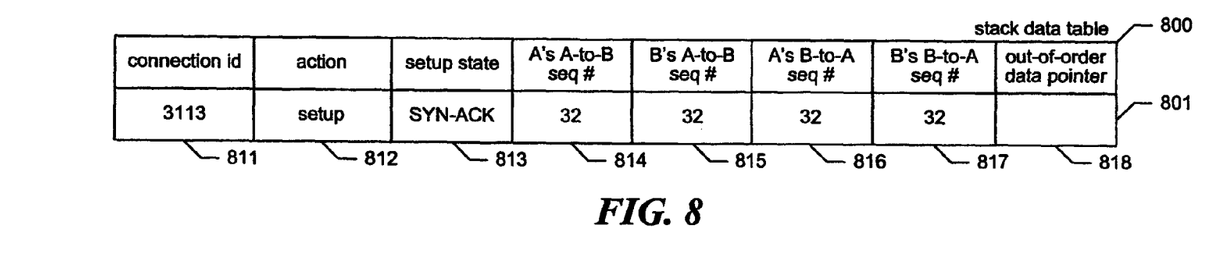
FIG. 8 is a data structure diagram showing a sample stack data table with the setup state of the row for connection 3113 updated to reflect the subsequent receipt of the next packet in the TCP connection setup process, the SYN-ACK packet.

FIG. 8 is a data structure diagram showing a sample stack data table with the setup state of the row for connection 3113 updated to reflect the subsequent receipt of the next packet in the TCP connection setup process, the SYN-ACK packet.

Figure 9:
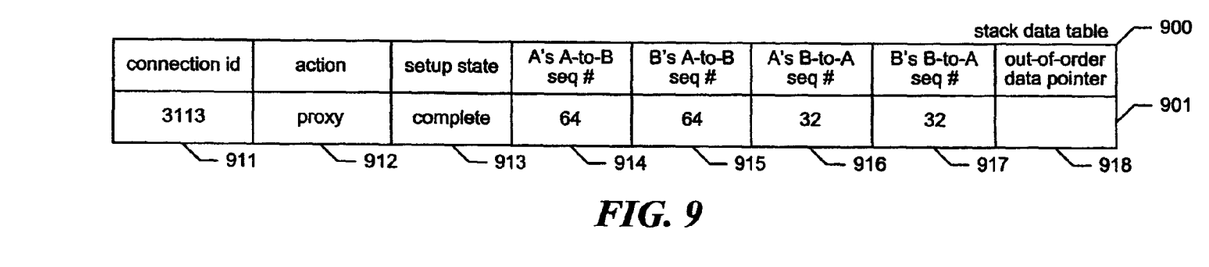
FIG. 9 is a data structure diagram showing a sample stack data table with the setup state of the row for connection 3113 updated to reflect the subsequent receipt of the third and final packet in the TCP connection setup process, the ACK packet.

FIG. 9 is a data structure diagram showing a sample stack data table with the setup state of the row for connection 3113 updated to reflect the subsequent receipt of the third and final packet in the TCP connection setup process, the ACK packet.

Returning to FIG. 6, in step 607, if the received packet completes the setup process for the transport protocol, then the facility continues in step 608, else these steps conclude. In step 608, the facility sets the action column of the row for the packet's connection to the value proxy as shown in FIG. 9. In step 609, the facility notifies the connection framework manager of the successful setup of the connection, passing the connection framework manager an indication of the protocol handler chain specified for the connection. After step 609, these steps conclude.

Figure 10:
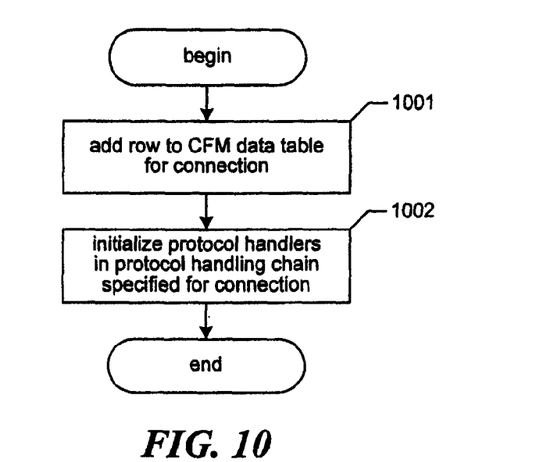
FIG. 10 is a flow diagram showing steps typically performed by the facility in the connection framework manager when it is notified of a successfully completed connection by the socket manager in step 609.

FIG. 10 is a flow diagram showing steps typically performed by the facility in the connection framework manager when it is notified of a successfully completed connection by the socket manager in step 609. In step 1001, the facility adds a row to the CFM data table for the connection. In step 1002, the facility initializes each protocol handler in the protocol handling chain specified for the connection. After step 1002, these steps conclude.

Figure 11:
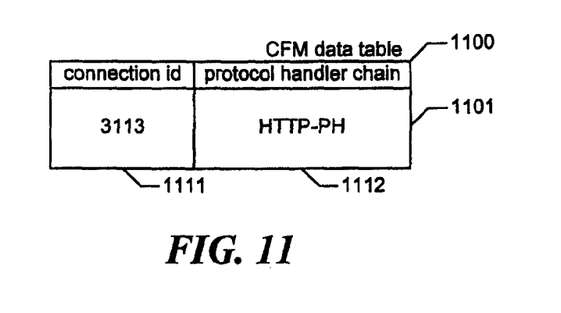
FIG. 11 is a data structure diagram showing sample contents of a CFM data table typically used by the facility.

FIG. 11 is a data structure diagram showing sample contents of a CFM data table typically used by the facility. The CFM data table 1100 is made up of rows, such as row 1101, each corresponding to a proxied connection whose setup process has been successfully completed. Each row is divided into the following columns: a connection ID column 1111 and a protocol handler chain column 1112. It can be seen that, in row 1101, the table specifies a protocol handler chain containing a single protocol handler, HTTP-PH, for connection ID 3113.

Figure 12:
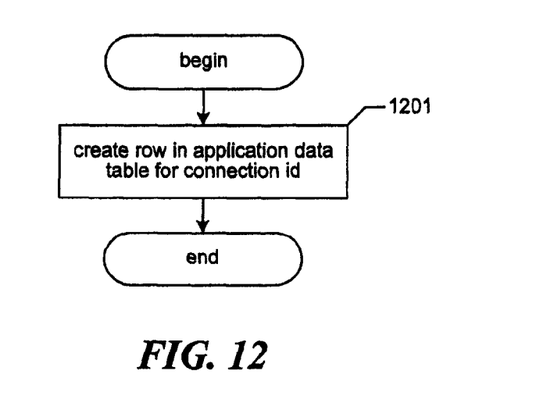
FIG. 12 is a flow diagram showing steps typically performed by the facility in the protocol handler when it is initialized by the connection framework manager in step 1002.

FIG. 12 is a flow diagram showing steps typically performed by the facility in the protocol handler when it is initialized by the connection framework manager in step 1002. In step 1201, the facility creates a row in the application data table to store application data that the protocol handler collects for the connection. After step 1201, these steps conclude.

Figure 13:
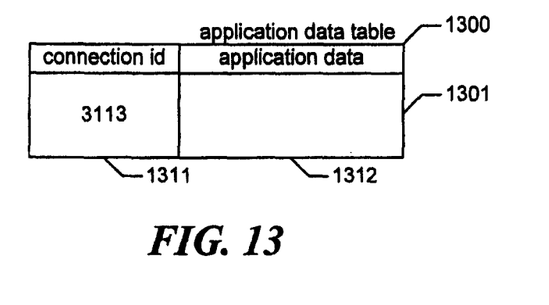
FIG. 13 is a data structure diagram showing an application data table 1300.

FIG. 13 is a data structure diagram showing an application data table 1300. The application data table is made up of rows, such as row 1301, each divided into the following columns: a connection ID column 1311, and an application data column 1312. The application data column is initially empty for row 1301. When the protocol handler subsequently receives application data conveyed in connection 3113, the protocol handler will assemble it in the application data column of row 1301 until the protocol handler has received enough information to determine that the application data is safe to forward to its destination, or takes other action with respect to the application data.

Returning to FIG. 6, in step 610, the facility branches based upon the action specified for the connection in the stack data table: if the action is setup, the facility continues in step 611; if the action is proxy, the facility continues in step 613; if the action is data relay, the facility continues in step 619. In step 611, if the packet is of the proper type for the current setup state shown in the connection's row of the stack data table, then the facility continues in step 606 to update the setup state in the stack data table as shown in FIGS. 8 and 9, else the facility continues in step 612 to drop the packet. After step 612, these steps conclude.

In step 613, the facility acknowledges the packet by generating and sending an acknowledgement packet to the packet's sender. The facility typically uses and updates the sequence number in the stack data table for the direction of the acknowledgement packet from the perspective of the acknowledgement packet's addressee. In step 614, if the packet's sequence number indicates that it is in order, then the facility continues in step 616, else the facility continues in step 615. In step 615, the facility adds the packet to a list of out-of-order packets for the connection pointed to by the out-of-order data pointer in the row of the stack data table for the connection. After step 615, these steps conclude.

In step 616, the facility removes any packets from the out-of-order packet list for the connection that are contiguous with the current packet. In step 617, the facility concatenates together the payload of the current packet with those of any packets removed from the out-of-order packet list in step 616. In step 618, the facility passes the concatenated payload data to the connection framework manager. After step 618, these steps conclude.

Figure 14:
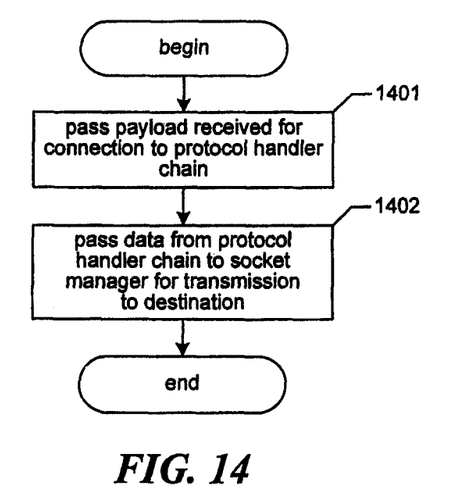
FIG. 14 is a flow diagram showing steps typically performed by the facility in the connection framework manager to process application data received from the socket manager.

FIG. 14 is a flow diagram showing steps typically performed by the facility in the connection framework manager to process application data received from the socket manager. In step 1401, the facility passes the application data received for the identified connection to a protocol handler chain specified for that connection in the CFM data table, together with the connection id. For example, for connection 3113, the facility passes the application data to the HTTP-PH protocol handler. In step 1402, the facility passes data received from the protocol handler chain for the connection, if any, to the socket manager for transmission to the application data's ultimate destination. After step 1402, these steps conclude.

Figure 15:
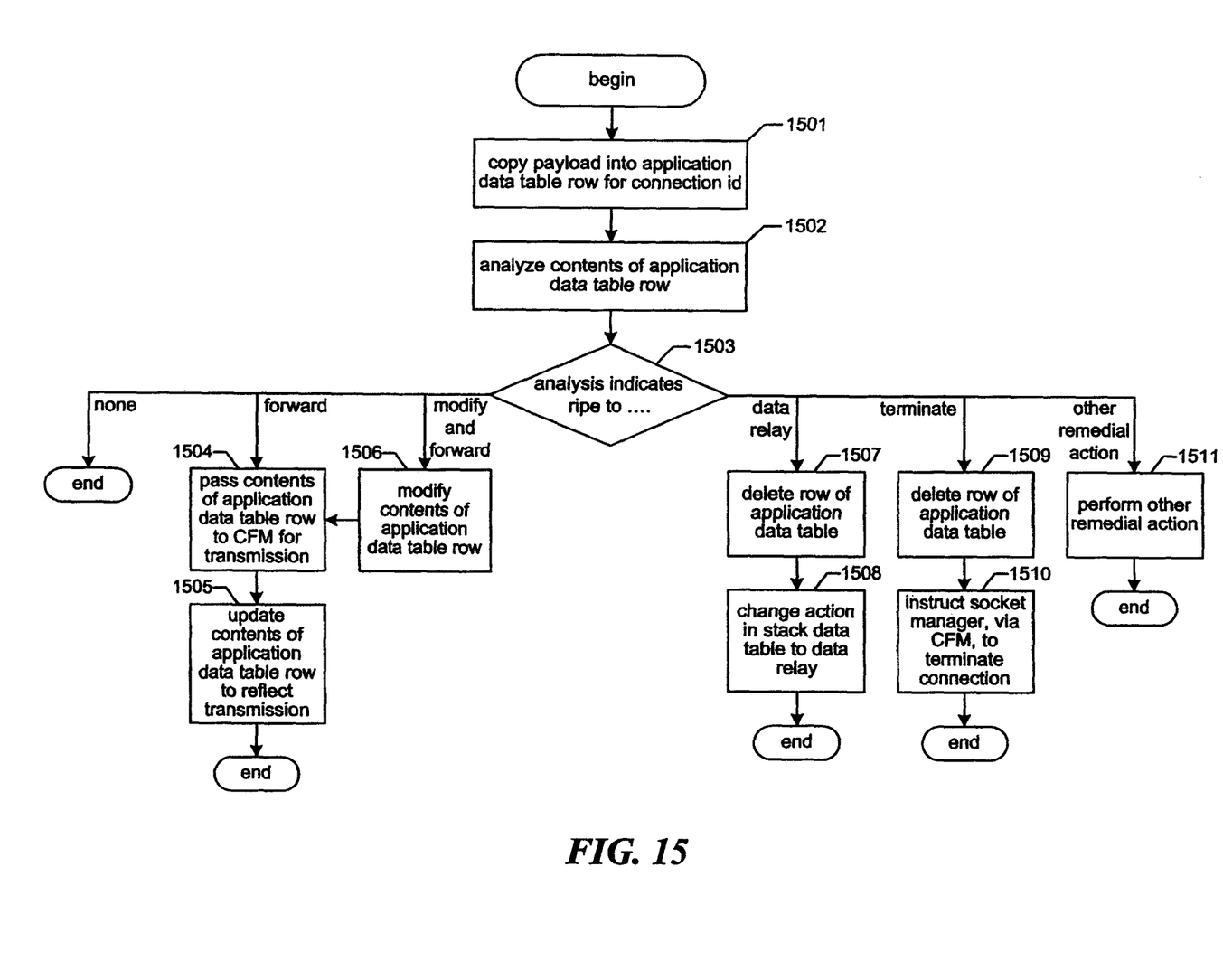
FIG. 15 is a flow diagram showing steps typically performed by the facility in a sample protocol handler.

FIG. 15 is a flow diagram showing steps typically performed by the facility in a sample protocol handler. It should be noted that protocol handlers typically perform processing that is highly application-specific, causing application handlers to be significantly diverse. In some embodiments, new protocol handlers may be implemented and used after the distribution of the facility. In some embodiments, protocol handlers may be implemented in a scripting language, such as the Python scripting language provided by the Python Software Foundation, described at http://www.python.org. This level of extensibility permits the facility to take advantage of protocol handlers for applications and/or application protocols including, but not limited to, HTTP, HTTPS, DNS, and SMTP.

In step 1501, the facility copies the application data received from the connection framework manager into the application data table row for the connection ID passed with the application data. In step 1502, the facility analyzes the contents of the application data row, in particular attempting to determine whether (1) at least a portion of the application data accumulated in the application data table row can be safely forwarded to its destination, and (2) whether any portion of the accumulated application data constitutes a risk that should be remediated. In step 1503, the facility branches on indications from the analysis of step 1502: if the analysis produced no results, then these steps conclude; if the analysis identifies application data that should be forwarded to the destination, then the facility continues in step 1504; if the analysis indicates that a portion of the application data should be modified before being forwarded, the facility continues in step 1506; if the analysis indicates that the connection should be switched to data relay mode, then the facility continues in step 1507; if the analysis indicates that the connection should be terminated, then the facility continues in step 1509; if the analysis indicates that other remedial action should be performed, then the facility continues in step 1511. In step 1504, the facility passes the indicated portion of the application data in the application data table row to the connection framework manager for transmission to the application data's destination. In step 1505, the facility updates the contents of the application data table row to reflect the transmission, such as by deleting from the application data table row application data passed in step 1504. After step 1505, these steps conclude.

In step 1506, the facility modifies the contents of the application data table row in order to remediate the application data, such as by deleting or modifying offending data, or inserting additional data. After 1506, the facility continues in step 1504.

In step 1507, the facility deletes the row of the application data table for the connection. In step 1508, the facility changes the action in the stack data table row for the connection to the data relay action. After step 1508, these steps conclude. In some cases, the application data table row contains application data for the connection that must be forwarded, or modified and forwarded, to its destination before switching to relay mode. In these cases, the facility typically executes step 1504 or steps 1506 and 1504 before executing step 1507 (not shown).

In step 1509, the facility deletes the row of the application data table for the connection. In step 1510, the facility instructs the socket manager, via the connection framework manager, to terminate the connection. After step 1510, these steps conclude.

In step 1511, the facility performs another remedial action, such as logging an exploit attempt automatically adding the offending node to a list of blocked network addresses, notifying a system administrator, etc. After step 1511, these steps conclude.

Figure 16:
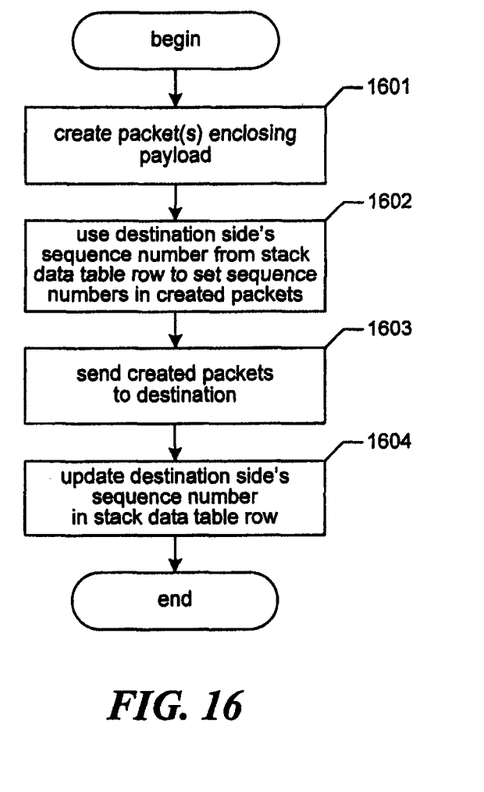
FIG. 16 is a flow diagram showing steps typically performed by the facility in the socket manager to process application data passed from a protocol handler chain via the connection framework manager.

FIG. 16 is a flow diagram showing steps typically performed by the facility in the socket manager to process application data passed from a protocol handler chain via the connection framework manager.

In step 1601, the facility creates one or more packets enclosing the received application data. In step 1602, the facility uses the sequence number stored in the stack database table row for the connection in the packets' direction from the perspective of the packets' destination to set the sequence numbers in the packets created in step 1601. In step 1603, the facility sends the packets created in step 1601 to their destination. In step 1604, the facility updates the sequence number in the stack data table row for the connection used in step 1602 to reflect the size of the packets sent in step 1603. After step 1604, these steps conclude.

Figure 17:
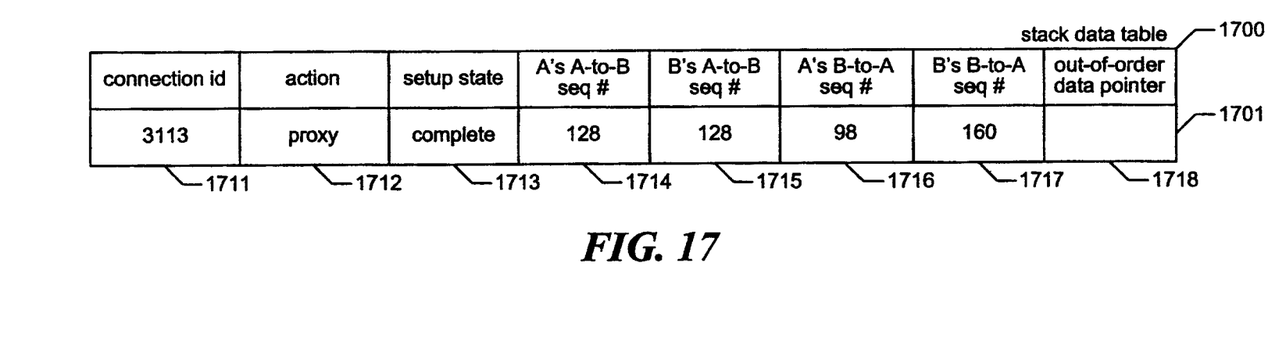
FIG. 17 is a data table diagram showing sample contents of the stack data table that reflect the deletion of application data from an application data stream.

FIG. 17 is a data table diagram showing sample contents of the stack data table that reflect the deletion of application data from an application data stream. It can be seen from columns 1716 and 1717 that B believes that it has sent 62 bytes more data to A than A believes that it has received from B, reflecting the facility's deletion of offending data sent from B to A.

Figure 18:
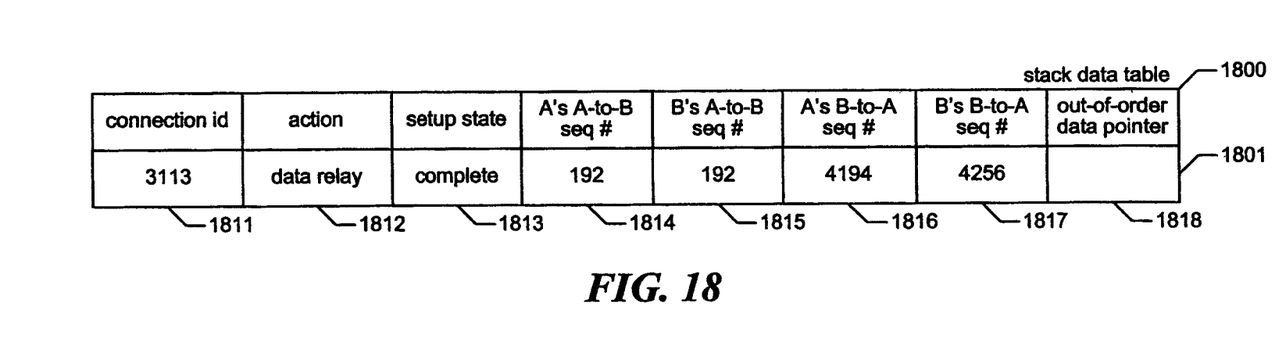
FIG. 18 is a data structure diagram showing sample contents of the stack data table reflecting a switch to data relay mode.

FIG. 18 is a data structure diagram showing sample contents of the stack data table reflecting a switch to data relay mode. It can be seen from action column 1812 that the current action for connection 3113 is data relay, causing the socket manager to directly pass packets for the connection without proxying them; i.e., without generating and sending its own acknowledgements or passing the packets' contents through the connection framework manager to a protocol handler chain, and only adjusting packet sequence numbers if a direction's sequence number from the perspective of one side of the connection has diverged from the sequence number in the same direction from the perspective of the other side of the connection. Where this is not true, in some embodiments, rather than processing a connection in this state through the socket manager, the facility updates the connection's row in the connection table to specify proxy=no, so that packets for the connection are forwarded by the packet filter without being passed to the socket manager.

It will be appreciated by those skilled in the art that the above-described facility may be straightforwardly adapted or extended in various ways. While the foregoing description makes reference to preferred embodiments, the scope of the invention is defined solely by the claims that follow and the elements recited therein.

We claim:

1. A method in a computing system for proxying network traffic for a particular network application between a pair of nodes including a first node and a second node, the method comprising:
   in a security facility operating on a processor of an intermediate node computing device, for packets received from either node of the pair:
      maintaining sequence information pertaining to each of a plurality of connections, the sequence information comprising sequence indicators from a perspective of the first node and sequence indicators from a perspective of the second node;
      filtering packets to be proxied under a set of policies;
      associating packets to be proxied with connections to which they belong;
      reordering the packets to be proxied for the respective connections to which they belong using the sequence information of the respective connections;
      performing analysis specific to the particular application on packet data of the packets to be proxied to determine whether the packet data is permissible;
      if it is determined that the packet data is not permissible, modifying the packet data to make the packet data permissible before the packet data is passed to its destination; and
      creatin one or more remediated packets contain in the modified packet data, the one or more remediated packets comprising sequence indicators from the perspective of a destination node, wherein the destination node is one of the first node and the second node and wherein the sequence indicators are based on the sequence information such that the modifying of the packet data is transparent to the first node and the second node.

2. The method of claim 1, further comprising passing the packet data directly to a protocol handler configured to perform the analysis from a packet filter configured to determine whether the packet is to be proxied.

3. The method of claim 1, further comprising passing the packet data from a packet filter, configured to determine whether the packet is to be proxied, to a protocol handler, configured to perform the analysis, via an intermediary.

4. The method of claim 1 wherein modifying the packet data includes rewriting the packet data before the packet data is passed to its destination.

5. The method of claim 1 wherein each of the packets to be proxied has a sequence number, and wherein data from the packets to be proxied is received in sequence number order by a protocol handler to perform the analysis.

6. An intermediate network node for proxying network traffic for a particular network application between a first node and a second node, comprising:
   a computing device comprising a processor;
   a packet filtering component operating on the processor that, for packets received from either the first node or the second node:
      filters packets not permissible and determines packets to be proxied under a set of policies; and
      associates unfiltered packets with connections to which they belong;
   a socket manager component operating on the processor that, for packets received from the filtering component:
      maintains sequence information pertaining to each of a plurality of connections, the sequence information comprising sequence indicators from a perspective of the first node and sequence indicators from a perspective of the second node;
      reorders the unfiltered packets for the respective connections to which they belong using the sequence information of the respective connections; and
      passes packet data of the reordered packets to a protocol handler for the distinguished application, the protocol handler operating on the processor of the computing device; and
   a protocol handler that:
      performs analysis specific to the application to determine whether the packet data is permissible;
      if it is determined that the packet data is not permissible, modifies the packet data to make the packet data permissible before the packet data is passed to a destination node; and
      passes the modified packet data to the socket manager component for transmission to the destination node;
   wherein the socket manager component further creates one or more remediated packets containing the modified packet data, the one or more remediated packets comprising sequence indicators from the perspective of the destination node, wherein the destination node is one of the first node and the second node and the sequence indicators are based on the sequence information, such that the modifying of the packet data is transparent to the first node and the second node.

7. One or more non-transitory computer storage medium collectively containing a first network application content gatekeeper module for a first network application, the first module having contents that cause a computing system to perform an application content gatekeeping method, the method comprising, for network traffic on behalf of the first network application:
   performing analysis specific to the first network application to determine whether the contents of the network traffic are permissible;
   if it is determined that the network traffic contents are not permissible, performing remediation before the network traffic contents are passed to their destination by modifying content of the network traffic, such that the content of the network traffic is permissible;
   creating one or more remediated packets containing the modified content, the one or more remediated packets comprising sequence indicators from the perspective of a destination node, wherein the destination node is one of a first node and a second node and the sequence indicators are based on sequence information maintained for each of the first node and the second node, such that the modifying of the packet data is transparent to the first node and the second node; and passing the remediated packets containing the modified content to the destination node.

8. The non-transitory computer storage medium of claim 7, further containing a second network application content gatekeeper module, such that the first and second network application content gatekeeper modules can be chained together such that network traffic may be routed first through the first network application content gatekeeper module, then through the second network application content gatekeeper module.

9. The non-transitory computer storage medium of claim 8, wherein the second network application content gatekeeper module is also for the first application, and performs analysis and/or remediation functionality for the first application not provided by the first network application content gatekeeper module.

10. The non-transitory computer storage medium of claim 8, wherein the first network application content gatekeeper module is for a first application protocol, and wherein the second network application content gatekeeper module is for a second application protocol, and the first and second network application content gatekeeper modules may be chained together to process network traffic on behalf of the first network application constituted in accordance with a layered protocol in which the first network application protocol is layered over the second network application protocol.

11. The non-transitory computer storage medium of claim 10, wherein the first network application protocol is SSL and the second network application protocol is HTTP.

12. The non-transitory computer storage medium of claim 7, further containing a second network application content gatekeeper module, such that network traffic not known to be on behalf of the first network application can be initially directed to the second network application content gatekeeper module, which in turn identifies the network traffic to be on behalf of the first network application and routes the network traffic to the first network application content gatekeeper module.

13. A method in a computing system for proxying network traffic between a pair of nodes in a first connection for a network application and a second connection, comprising, in an intermediate node between the pair of nodes:
    for a first period of time, performing application-specific content analysis and content remediation on traffic for the first connection, comprising:
        determining whether packet data associated with the first connection is permissible;
        if it is determined that the packet data is not permissible, modifying the packet data to make the packet data permissible before the packet data is passed to its destination; and
        creating one or more remediated packets containing the modified packet data, the one or more remediated packets comprising sequence indicators from the perspective of a destination node, wherein the destination node is one of the pair of nodes and wherein the sequence indicators are based on maintained sequence information such that the modifying of the packet data is transparent to the pair of nodes;
    detecting a state of the first connection after which application-specific content analysis is no longer required;
    for a second period of time following the detecting, passing traffic of the first connection without performing application-specific content analysis and content remediation; and
    for the first and the second period of time, performing application-specific content analysis and content remediation on the second connection.

14. The method of claim 13, further comprising, during all of the second period and at least a portion of the first period, adjusting sequence numbers in the passed traffic to reflect a content size change effected by the content modification.

15. The method of claim 14 wherein the adjusting is performed at least in part using special-purpose hardware attached to the computing system.

16. A non-transitory computer-readable storage medium whose contents cause an intermediate node between a pair of nodes to perform a method for proxying network traffic between the pair of nodes in a first connection for a network application and a second connection, the method comprising:
    for a first period of time, performing application-specific content analysis and content remediation on traffic for the first connection, comprising:
        determining whether packet data associated with the first connection is permissible;
        if it is determined that the packet data is not permissible, modifying the packet data to make the packet data permissible before the packet data is passed to its destination; and
        creating one or more remediated packets containing the modified packet data, the one or more remediated packets comprising sequence indicators from the perspective of a destination node, wherein the destination node is one of the pair of nodes and wherein the sequence indicators are based on maintained sequence information such that the modifying of the packet data is transparent to the pair of nodes;
    detecting a state of the first connection after which application-specific content analysis is no longer required;
    for a second period of time following the detecting, passing the traffic of the first connection without performing application-specific content analysis and content remediation; and
    for the first and the second period of time, performing application-specific content analysis and content remediation on the second connection.

* * * * *